United States Patent [19]

Rodenhouse

[11] Patent Number: 5,187,208
[45] Date of Patent: Feb. 16, 1993

[54] POLYCARBONATE COMPOSITIONS RESISTANT TO GAMMA RADIATION

[75] Inventor: Randall A. Rodenhouse, Uerdingen, Fed. Rep. of Germany

[73] Assignee: Miles Inc., Pittsburgh, Pa.

[21] Appl. No.: 788,686

[22] Filed: Nov. 6, 1991

[51] Int. Cl.$^5$ .................... C08L 69/00; C08G 65/42; C08G 64/16
[52] U.S. Cl. .................... 523/136; 524/281; 524/373; 524/611; 525/403; 525/462; 525/470; 528/202; 558/266; 558/268
[58] Field of Search ............... 524/280, 281, 373, 611; 525/403, 462, 470; 523/136; 528/202; 558/266, 268

[56] References Cited

U.S. PATENT DOCUMENTS

| | | | |
|---|---|---|---|
| 3,148,203 | 9/1964 | Schisla | 558/266 |
| 4,451,641 | 5/1984 | Sublett et al. | 528/295.5 |
| 4,460,445 | 7/1984 | Rekers | 204/159.2 |
| 4,624,972 | 11/1986 | Nace | 523/136 |
| 4,873,271 | 10/1989 | Lundy et al. | 523/136 |

*Primary Examiner*—David J. Buttner
*Attorney, Agent, or Firm*—Joseph C. Gil; Aron Preis

[57] ABSTRACT

A thermoplastic polycarbonate molding composition resistant to gamma-radiation is disclosed. The composition incorporates about 0.05 to 5.0 percent by weight of and end-capped poly(alkyl oxide) conforming to

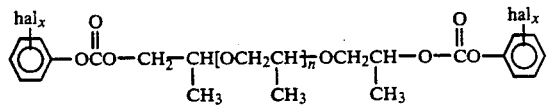

where hal denotes bromine or chlorine, n is about 10 to 40 and x is 1 to 5.

The composition was found to be resistant to the yellowing which characterized polycarbonate compositions upon exposure to gamma radiation. The composition of the invention not only has low initial color change upon exposure but also a small change in yellowness after long term storing.

10 Claims, No Drawings

POLYCARBONATE COMPOSITIONS RESISTANT TO GAMMA RADIATION

FIELD OF THE INVENTION

The invention relates to thermoplastic molding compositions and in particular to polycarbonate composition which are rendered resistant to Gamma radiation.

SUMMARY OF THE INVENTION

The invention relates to thermoplastic polycarbonate molding compositions which are rendered resistant to gamma-radiation by the incorporation therewith of about 0.05 to about 5.0 percent by weight of an end-capped poly(alkyl oxide) conforming to

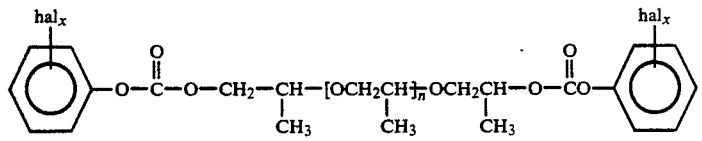

where hal denotes bromine or chlorine, n is about 10 to 40, preferably 15 to 35 and x is 1 to 5.

The compositions were found to be resistant to the yellowing which characterized polycarbonate compositions upon exposure to gamma radiation. The composition of the invention not only has low initial color change upon exposure but also a small change in yellowness after long term storing.

BACKGROUND OF THE INVENTION

Because of its physical and mechanical properties polycarbonate resins were found to be eminently suitable for a variety of applications in the medical field. Applications which require sterilization by exposure to gamma radiation present a problem since polycarbonate tends to yellow and show increased haze. The art is noted to include U.S. Pat. No. 4,624,972 which disclosed polycarbonate compositions resistant to gamma radiation containing an ester of an aromatic polycarboxylic acid. U.S. Pat. No. 4,451,641 disclosed a container prepared from a copolyester which has been modified with either a dimer acid or a dimer glycol. The copolyester is said to have an improved resistance to gamma radiation. Radiation stable polyolefin compositions have been disclosed in U.S. Pat. No. 4,460,445. U.S. Pat. No. 4,873,271 which relates to gamma radiation resistant polycarbonate composition disclosed an ester of a poly(alkylene)oxide as a stabilizer. Also relevant is the disclosure in co-pending, commonly assigned, patent application Ser. No. 718,064 which was filed on Jun. 20, 1991.

DETAILED DESCRIPTION OF THE INVENTION

The composition of the invention comprises a polycarbonate resin and a stabilizing agent in an amount sufficient to enhance the resistance of the resin to yellowness upon exposure to gamma radiation. Preferably, the composition contains about 0.05 to 5.0, more preferably 0.1 to 3.0 percent of the stabilizing agent.

The polycarbonate resins useful in the practice of the invention are homopolycarbonates, copolycarbonates and terpolycarbonates or mixtures thereof. The polycarbonates generally have a weight average molecular weight of 10,000–200,000, preferably 20,000–80,000 and their melt flow rate, per ASTM D-1238 at 300° C., is about 1 to about 65 gm/10 min., preferably about 2–15 gm/10 min. They may be prepared, for example, by the known diphasic interface process from a carbonic acid derivative such as phosgene and dihydroxy compounds by polycondensation (see German Offenlegungsschriften 2,063,050; 2,063,052; 1,573,703; 2,211,956; 2,211,957 and 2,248,817; French Patent 1,561,518; and the monograph H. Schnell, "Chemistry and Physics of Polycarbonates" 1 Interscience Publishers, New York, 1964, all incorporated herein by reference).

In the present context, dihydroxy compounds suitable for the preparation of the polycarbonates of the invention conform to the structural formulae (1) or (2)

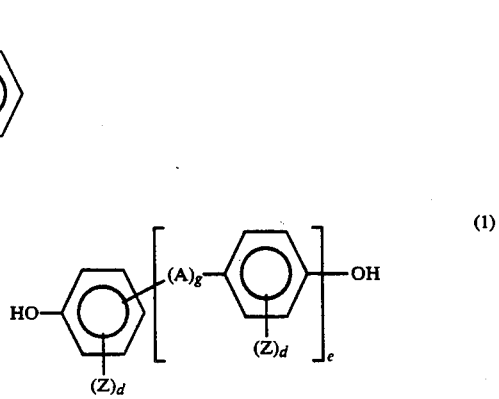

wherein

A denotes an alkylene group with 1 to 8 carbon atoms, an alkylidene group with 2 to 8 carbon atoms, a cycloalkylene group with 5 to 15 carbon atoms, a cycloalkylidene group with 5 to 15 carbon atoms, a carbonyl group, an oxygen atom, a sulfur atom, -SO- or -SO$_2$- or a radical conforming to

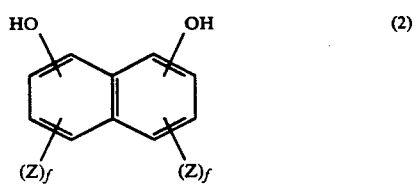

e and g both denote the number( to 1;

Z denotes F, Cl, Br or C$_1$-C$_4$-alkyl and if several Z radicals are substituents in one aryl radical, they may be identical or different one from the other; d denotes an integer of from 0 to 4; and f denotes an integer of from 0 to 3.

Among the dihydroxy compounds useful in the practice of the invention are hydroquinone, resorcinol, bis-(hydroxyphenyl) alkanes, bis-(hydroxyphenyl) ethers, bis-(hydroxyphenyl)ketones, bis-(hydroxyphenyl)-sulfoxides, bis-(hydroxyphenyl)sulfides, bis-(hydroxyphenyl)-sulfones, and α,α'-bis-(hydroxyphenyl)-diisopropylbenzenes, as well as their nuclear-alkylated compounds. These and further suitable aromatic dihydroxy compounds are described, for example, in U.S. Pat. Nos. 3,028,356; 2,999,835; 3,148,172; 2,991,273; 3,271,367; and 2,999,846, all incorporated herein by reference. Further examples of suitable bisphenols are 2,2-bis-(4-hydroxyphenyl)-propane (bisphenol A), 2,4-bis-(4-hydroxyphenyl)-2-methylbutane, 1,1-bis-(4-hydroxyphenyl)cyclohexane, α,α'-bis-(4-hydroxyphenyl)-p-diisopropylbenzene, 2,2-bis-(3-methyl-4-hydroxyphenyl)-propane, 2,2-bis-(3-chloro-4-hydroxyphenyl)-propane, bis-(3,5-dimethyl-4-hydroxyphenyl)ethane, 2,2-bis-(3,5-dimethyl-4-hydroxyphenyl)-propane bis-(3,5-dimethyl-4-hydroxyphenyl)-sulfide, bis-(3,5-dimethyl-4-hydroxyphenyl)-sulfoxide, bis-(3,5-dimethyl-4-hydroxyphenyl)sulfone, hydroxybenzophenone, 2,4-bis-(3,5-dimethyl-4-hydroxyphenyl)-cyclohexane, α,α'-bis-(3,5-dimethyl-4-hydroxyphenyl)-p-diisopropylbenzene and 4,4'-sulfonyl diphenyl.

Examples of particularly preferred aromatic bisphenols are 2,2-bis-(4-hydroxyphenyl)-propane, 2,2-bis-(3,5-dimethyl-4-hydroxyphenyl)-propane and 1,1-bis-(4-hydroxyphenyl)cyclohexane.

The most preferred bisphenol is 2,2-bis-(4-hydroxyphenyl)-propane (bisphenol A).

The polycarbonates of the invention may entail in their structure units derived from one or more of the suitable bisphenols.

Among the resins suitable in the practice of the invention there are included phenolphthalein based polycarbonate, copolycarbonates and terpolycarbonates such as are described in U.S. Pat. Nos. 3,036,036 and 4,210,741, both incorporated by reference herein.

The polycarbonates of the invention may also be branched by condensing therein small quantities, e.g., 0.05-2.0 mol (relative to the bisphenols) of polyhydroxyl compound. Polycarbonates of this type have been described, for example, in German Offenlegungsschriften 1,570,533; 2,116,974 and 2,113,374; British Patents 885,442 and 1,079,821 and U.S. Pat. No. 3,544,514. The following are some examples of polyhydroxyl compounds which may be used for this purpose: phloroglucinol; 4,6-dimethyl-2,4,6-tri-(4-hydroxyphenyl)-heptane; 1,3,5-tri-(4-hydroxyphenyl)-benzene; 1,1,1-tri-(4-hydroxyphenyl)-ethane; tri-(4-hydroxyphenyl)-phenylmethane; 2,2-bis-[4,4-(4,4'-dihydroxydiphenyl)-cyclohexyl]-propane; 2,4-bis-(4-hydroxy-1-isopropylidine)-phenol; 2,6,-bis-(2'-dihydroxy-5'-methylbenzyl)-4-methylphenol; 2,4-dihydroxybenzoic acid; 2-(4-hydroxyphenyl)-2-(2,4-dihydroxyphenyl)-propane and 1,4-bis-(4,4'-dihydroxytriphenylmethyl)-benzene. Some of the other polyfunctional compounds are 2,4 dihydroxybenzoic acid, trimesic acid, cyanuric chloride and 3,3-bis-(4-hydroxyphenyl)-2-oxo-2,3-dihydroindole.

In addition to the polycondensation process mentioned above, other processes for the preparation of the polycarbonates of the invention are polycondensation in a homogeneous phase and transesterification. The suitable processes are disclosed in the incorporated herein by references U.S. Pat. Nos. 3,028,365; 2,999,846; 3,153,008; and 2,991,273.

The preferred process for the preparation of polycarbonates is the interfacial polycondensation process.

Other methods of synthesis in forming the polycarbonates of the invention such as disclosed in U.S. Pat. No. 3,912,688, incorporated herein by reference, may be used.

Suitable polycarbonate resins are available in commerce, for instance, Makrolon FCR, Makrolon 2600, Makrolon 2800 and Makrolon 3100, all of which are bisphenol A based homopolycarbonate resins differing in terms of their respective molecular weights and characterized in that their melt flow indices (MFR) per ASTM D-1238 are about 16.5-24, 13-16, 7.5-13.0 and 3.5-6.5 gm/10 min., respectively. These are products of Mobay Corporation of Pittsburgh, Pa.

The stabilizer of the invention - a halogenated aromatic carbonate end-capped poly(alkyl oxide) conforming to the structure depicted below - may be prepared by reacting the appropriate polyalkylene glycol chloroformate with the appropriate halogen substituted phenol. Alternatively the stabilizer may be prepared by reacting the chloroformate of the appropriate halogen substituted phenol with the appropriate polyalkylene glycol. Furthermore it is possible to react the appropriate halogen substituted diphenyl carbonate with the appropriate polyalkylene glycol.

The stabilizer conforms to

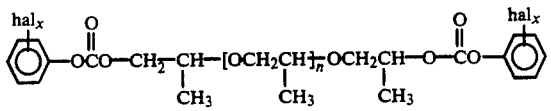

where hal denotes bromine or chlorine, n is about 10 to 40, preferably 15 to 35 and x is 1 to 5.

In the practice of the invention the stabilizer is added to the polycarbonate resin at a level of 0.05 to 5 preferably 0.1 to 3.0 percent, relative to the weight of the composition, via extrusion techniques. Once extruded the composition may be molded by conventional methods for molding of thermoplastics.

Conventional additives may also be incorporated in the composition for their art-recognized utility. These include release agents, plasticizers, thermal and UV stabilizers, antioxidants, fillers, reinforcements and the like. Especially useful are thermal stabilizers such as phosphines, phosphites and phosphates which may advantageously be added to the stabilized composition of the invention.

EXPERIMENTAL

The stabilizer of the invention was incorporated in a polycarbonate resin and specimens were molded from the composition. The specimens were subjected to gamma radiation and the change in yellowness index was measured and is reported below. The effect of the radiation was determined on specimens which were injection molded at 290° C.

In all the experiments, the polycarbonate was Makrolon 2608 resin which is a bisphenol-A based polycarbonate having a melt flow rate of about 11 gm/10 min per ASTM D-1238 - a product of Mobay Corporation.

1. An end-capped poly(alkyl oxide) stabilizer used in demonstrating the invention may be prepared by first reacting phosgene with propylene glycol to form the corresponding dichloroformate. The resulting dichloroformate is then dissolved in a suitable solvent for instance tetrahydrofuran, along with a brominated phenol and to this solution, at room temperature, pyridine is added. After the reaction has been completed the mixture is filtered and the solvent removed yielding a viscous liquid conforming structurally to

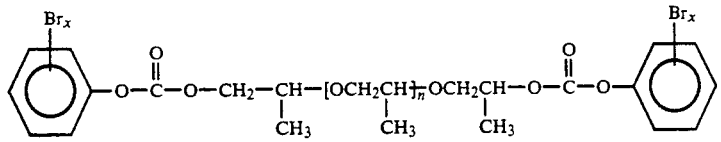

where n is 10–40 and where x is 1 to 5.

2. A stabilizer was thus prepared: The dichloroformate of propylene glycol (20.0 gm, 0.0178 mole) and 2,4,6-tribromophenol (11.75 gm, 0.0355 mole) were dissolved in dry tetrahydrofuran and to this homogeneous solution at room temperature was added pyridine (3.0 ml) dropwise. As the pyridine was added a precipitate forms. After 12 hours stirring at room temperature the mixture was filtered and the tetrahydrofuran removed under vacuum. The resulting oil was redissolved in hexane and filtered to remove any undissolved material. The hexane was then removed under vacuum to produce 27.63 (90%) of clear colorless oil.

The resulting end-capped poly(alkyl oxide) was blended at a level of 1 wt. % with the polycarbonate resin. The components were tumble blended and then extruded in a single screw extruder and pelletized in a conventional manner. Specimens measuring about 2"×3"33 0.10" were prepared by injection molding. The specimens we e then exposed to gamma radiation at a dose of 2.5 Mrad. The thus irradiated specimens were stored in the dark and the yellowness index (YI), in accordance with ASTM D 1925, was determined at intervals.

In Table 1 there is shown the performance of specimens molded from a polycarbonate composition in accordance with the invention. The stabilizer was based on a propylene glycol having a molecular weight of 1000.

The results show low initial color and little or no change in the yellowness index (YI) during storage.

The results of the evaluation are shown below.

TABLE 1

| Yellowness Index (YI) of stabilized compositions | | |
|---|---|---|
| | x = 5* | x = 3 |
| Initial YI | 8.30 | 3.15 |
| YI$_0$** | 11.51 | 8.70 |
| (ΔYI$_0$)*** | 3.21 | 5.55 |
| YI$_{10}$ | 11.51 | 8.70 |
| (ΔYI$_{10}$) | 3.21 | 5.55 |
| YI$_{20}$ | 11.30 | 8.69 |
| (ΔYI$_{20}$) | 3.00 | 5.54 |
| YI$_{40}$ | 11.26 | 8.63 |
| (ΔYI$_{40}$) | 2.96 | 5.48 |

*"x" denotes the number of bromine substituents on the end-capping moiety.
**The subscripts indicate the number of days that the specimens were stored in the dark after exposure to gamma radiation.
***"Δ" denotes the difference between the yellowness index after the exposure and that of the initial value, of the un-radiated sample.

In a second set of experiments the propylene glycol used in preparing the stabilizer had a molecular weight of about 2000. The method of end-capping and the procedures for preparing the samples and their evaluation were as described above. The table below summarizes the results.

TABLE 2

| Yellowness Index (YI) of stabilized compositions and of the unstabilized resin (control) | | | |
|---|---|---|---|
| | x = 5* | x = 3 | control |
| Initial YI | 4.98 | 3.02 | 3.85 |
| YI$_0$** | 9.27 | 8.52 | 20.43 |
| (ΔYI$_0$)*** | 4.29 | 5.50 | 16.58 |
| YI$_7$ | 8.98 | 8.56 | 16.39 |
| (ΔYI$_7$) | 4.00 | 5.54 | 12.54 |
| YI$_{12}$ | 9.02 | 8.58 | 16.14 |
| (ΔYI$_{12}$) | 4.04 | 5.56 | 12.29 |
| YI$_{20}$ | 9.10 | 8.65 | 16.09 |
| (ΔYI$_{20}$) | 4.12 | 5.63 | 12.24 |
| YI$_{40}$ | 9.09 | 8.60 | 16.02 |
| (ΔYI$_{40}$) | 4.11 | 5.58 | 12.17 |

*"x" denotes the number of bromine substituents on the end-capping moiety.
**The subscripts indicate the number of days that the specimens were stored in the dark after exposure to gamma radiation.
***"Δ" denotes the difference between the yellowness index after the exposure and that of the initial value, of the un-radiated sample.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A thermoplastic molding composition comprising
   (i) an aromatic polycarbonate resin and about 0.05 to 5.0% of
   (ii) a stabilizing agent conforming to

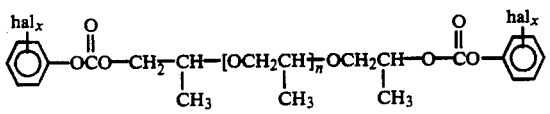

where hal denotes bromine or chlorine n is 10 to 40 and x is 1 to 5.

2. The composition of claim 1 wherein said (ii) is present in an amount of about 0.1 to 3.0 percent relative to the weight of the composition.

3. The composition of claim 1 wherein said x is 5.

4. The composition of claim 1 wherein said x is 3.

5. The composition of claim 1 wherein said polycarbonate is a homopolymer based on bisphenol A.

6. The composition of claim 1 wherein said hal is bromine.

7. The composition of claim 6 wherein said x is 5.

8. The composition of claim 6 wherein said x is 3.

9. The composition of claim 1 wherein said n is 15 to 35.

10. The composition of claim 9 wherein n is 3.

* * * * *